United States Patent
Peek et al.

Patent Number: 6,028,133
Date of Patent: Feb. 22, 2000

[54] PHENOLIC RESINS COMPATIBLE WITH WAX EMULSIONS

[75] Inventors: Brian M. Peek; Barry W. Sewell, both of Conyers, Ga.

[73] Assignee: Georgia-Pacific Resins, Inc., Atlanta, Ga.

[21] Appl. No.: 09/044,990

[22] Filed: Mar. 20, 1998

[51] Int. Cl.[7] .............................. C28L 91/06; B32B 21/04
[52] U.S. Cl. ................ 524/276; 524/277; 524/487; 524/488; 524/489; 524/596; 524/598; 524/13; 524/19; 428/485; 428/528
[58] Field of Search .................... 524/276, 277, 524/487, 488, 489, 596, 598, 13, 19; 428/485, 528

[56] References Cited

U.S. PATENT DOCUMENTS

| | | | |
|---|---|---|---|
| 3,532,657 | 10/1970 | Dick et al. ............................. | 524/421 |
| 3,560,431 | 2/1971 | Weedon et al. ....................... | 524/423 |
| 3,872,056 | 3/1975 | Daubach et al. ...................... | 528/158 |
| 3,956,205 | 5/1976 | Higginbottom ....................... | 524/25 |
| 4,264,760 | 4/1981 | Meyer .................................. | 525/505 |
| 4,407,999 | 10/1983 | Fushiki et al. ....................... | 524/276 |
| 4,608,408 | 8/1986 | Hood et al. .......................... | 524/15 |
| 4,616,056 | 10/1986 | Chan et al. .......................... | 524/392 |
| 4,814,039 | 3/1989 | Willging .............................. | 524/47 |
| 5,530,048 | 6/1996 | McDonald et al. .................. | 524/418 |
| 5,549,963 | 8/1996 | Elgarhy et al. ...................... | 525/129 |

*Primary Examiner*—James J. Seidleck
*Assistant Examiner*—Olga Asinovsky
*Attorney, Agent, or Firm*—Banner & Witcoff, Ltd.

[57] ABSTRACT

A phenolic resin modified with an alkali salt of sulfite or bisulfite in order to provide compatibility with a wax emulsion sizing agent, an adhesive prepared from the phenolic resin and wax emulsion, and the use of the adhesive in making bonded composites such as wood products, including, parallel strand lumber, oriented strand board (OSB), laminated veneer lumber (LVL), medium density fiberboard, wafer board and particle board, and textile products.

21 Claims, No Drawings

PHENOLIC RESINS COMPATIBLE WITH WAX EMULSIONS

FIELD OF THE INVENTION

The invention is directed to a phenolic resin that is modified with an alkali salt of sulfite or bisulfite in order to provide compatibility with a wax emulsion sizing agent, an adhesive prepared from the phenolic resin and wax emulsion, and the use of the adhesive in making bonded composites such as wood products, including, parallel strand lumber, oriented strand board (OSB), laminated veneer lumber (LVL), medium density fiberboard, wafer board and particle board, and textile products.

BACKGROUND OF THE INVENTION

There are a variety of adhesives for composites such as particle boards, fiber boards, and textile composites. Generally these adhesives are made from urea-formaldehyde resins, melamine-urea-formaldehyde resins, phenol-formaldehyde resins, and the like. In order to impart sufficient water-resistant properties to the constructions made with these resins, attempts have been made to combine a wax emulsion sizing agent with the resin. However, it has been very problematic to obtain a stable blend of resin and wax emulsion. Wax solids may not remain homogeneously suspended in mixtures with water-borne resins, particularly during transport, transfer, and use. Thus, the resin-wax blend needs to be used immediately or else separation occurs resulting in non-uniformity in the water-repellency and bond quality imparted to the composite by the (combined, mixed or blended) resin and wax emulsion. Also, the amount of wax that is incorporated into the billet is very difficult to control or determine. Further, since wood shris and swells as its moisture content varies, if the composite is not properly treated with a sizing agent and resin, the composite will have poor dimensional stability on exposure to moisture.

Often the wax emulsion is combined with the resin at the time of use. Although it would appear to be more convenient to provide the user with a ready-to-use adhesive that requires no mixing prior to application, however the end user may want the flexibility of combining the resin and wax in different proportions at his site. Thus, there have been attempts to modify the wax to make it more compatible with the resin. U.S. Pat. No. 4,407,999, for example, describes a method of oxidizing the wax used to make an emulsion which could be blended with adhesives. Another method that leads to improved resin/wax compatibility is combining a wax emulsion with a pH that closely matches that of the resin and adding this emulsion to the rein while the resin is hot.

These prior art methods require changes in the manufacturing procedures of the wax or wax emulsion and/or special handling of the wax emulsion and additional manufacturing steps to achieve resin/wax compatibility. It is desirable to provide a resin/wax combination that does not require special treatment of the wax prior to combination with the resin. This would allow the end user maximum flexibility when combining the resin and wax emulsion.

SUMMARY OF THE INVENTION

In the present invention, a phenolic (PF) resin is modified with an alkali salt of sulfite or bisulfite to obtain a resin with an anionic character which is compatible with wax emulsions. An advantage with the present invention is that the wax does not need any special preparation or modification to obtain excellent compatibility with PF resins. Because the resin is modified to blend with wax emulsions without special manufacturing procedures or modifications to the wax emulsion, flexibility at the wood composite mill is possible. For example, if a higher level of wax is needed for a particular construction, the change can be made by adding more wax emulsion to the current inventory without modification of the wax emulsion. The product can also be produced as a ready-to-use product and delivered pre-mixed.

The present invention is therefore directed to a phenolic resin/wax emulsion adhesive comprising a phenolic resin which is compatible with the wax emulsion and is prepared by reacting phenol and formaldehyde with an alkali salt of sulfite or bisulfite.

The present invention is further directed to a composite prepared by bonding furnish with the adhesive phenolic resin/wax emulsion composition and to a process of making a composite comprising applying the adhesive to a furnish and then pressing and heating.

Further, the present invention is directed to combining the phenolic resin with a wax emulsion by:

(a) heating the resin to an initial temperature of above 40° C., wherein the resin has a pH of about 9 to 12;

(b) adjusting the pH of a wax emulsion to within about 1 pH unit of the pH of the resin; and (c) combining the wax emulsion with the resin and mixing while maintaining the temperature of the resin above 40° C.

DETAILED DESCRIPTION OF THE INVENTION

The present invention is directed to modifying a phenolic resin during its manufacture in order to obtain a phenolic resin with an anionic character that is compatible with wax emulsions. In accordance with the present invention, the phenolic resin is modified with an alkali salt of sulfite or bisulfite. The resin is modified by the alkali sulfite salt by the addition of sulfo or sulfomethyl groups into the polymer structure.

Suitable sulfites include, but are not limited to sodium and potassium sulfites. Preferably sodium sulfite is used. The amount of sulfite added to the resin is between about 0.1 and 35 wt % based on the total weight of the resin solids, preferably about 2 to 28 wt %, more preferably about 14 to 24 wt %, and most preferably about 18 wt %.

The resin may be any thermosetting (formaldehyde-based) resin used in preparing adhesives for bonding composite wood products such as phenol-formaldehyde resins, phenol-resorcinol-formaldehyde resins, urea-melamine-formaldehyde resins, melamine-formaldehyde resins, phenol-melamine-formaldehyde resins, melamine-urea-resorcinol-formaldehyde resins, and combinations thereof. Although the application will be discussed in terms of the phenol-formaldehyde resin, it is understood that the phenol may be partially or totally replaced by resorcinol, hydroquinone, cresols, and other phenol derivatives.

The resins may be prepared by any suitable method to provide an adhesive resin having a final pH of between about 9 and 12 and a sufficiently high formaldehyde mole ratio to make the resin thermosetting. For example, a phenolic resole resin is prepared to provide a formaldehyde to phenol mole ratio of about 1:1 to 3:1, preferably, about 1.9:1 to 2.5:1. The present invention is not limited to any particular process of preparing the resin and methods are well known to those skilled in the art.

The alkali salt of sulfite may be added as part or all of the catalyst charge. The alkali salt of sulfite reacts with formaldehyde and phenol to form a polymer with anionic groups. The alkali salt of sulfite may be added before, after, or in between formaldehyde charges. In the present invention, the alkali salt of sulfite can be added as part of the initial catalyst charge.

Skilled practitioners recognize that the reactants used to prepare the resin are commercially available in many forms. Any form which can react with the other reactants and which does not introduce extraneous moieties deleterious to the desired reaction and reaction product can also be used in the preparation of the resins used in the adhesives of the present invention.

Formaldehyde, for instance, is available in many forms. Paraform (solid, polymerized formaldehyde) and formalin solutions (aqueous solutions of formaldehyde, sometimes with methanol, in 37 percent, 44 percent, or 50 percent formaldehyde concentrations) are common. Instead of formaldehyde, other aldehydes may be used such as acetaldehyde, and propionaldehyde. Typically, fornalin solutions are preferred as the aldehyde source.

The phenol component of the resin includes any phenol typically used in preparing phenolic resole resins. Typically, ordinary phenol is used, but the phenol may be partly or completely substituted with xylenols, cresols, catechol, resorcinol, alkyl resorcinols, other naturally occurring or synthetic phenols or alkyl phenols such as cresylic acids, urea, melamine, or combinations thereof Urea is available in many forms. Solid urea, such as prill, and urea solutions, typically aqueous solutions, are common. Urea is also available in combination with formaldehyde as a UF concentrate.

Melamine is also commercially available and the melamine may be totally or partially replaced with other aminotriazine compounds. Other suitable aminotriazine compounds include substituted melamines, or cycloaliphatic guanamines, or mixtures thereof.

Any suitable catalyst may be used to form the thermosetting resin. Phenolic resins, for instance, typically use alkali metal hydroxides, alkaline earth hydroxides, ammonium hydroxide, metal carbonates, and amines. Preferably the catalyst for preparing a phenolic resin is sodium hydroxide.

The wax emulsion (also known as paraffin emulsions) may be formed from natural waxes such as slack wax, whale wax, pappy wax, honey wax, and chinese wax, or from synthetic waxes such as esters of fatty acids, for example, n-octadecyl palmitate and cetyl stearate. Slack wax, a solid at ambient temperatures, is a by-product of oil refining processes, is sold as a commodity product, and is a preferred wax for reasons of economy and its high melting temperature. The present invention is not limited to any particular wax so long as the wax provides the desired sizing or water-repellant properties in the end product.

The wax emulsion is a wax-in-water emulsion and is typically formed by, for example, stirring molten wax into water in the presence of a dispersant, emulsifier or surfactant. Most commercial wax emulsions may be used. Preferably, no additional surfactants, other than what was needed to produce a stable wax emulsion, are added to the combined resin and emulsion. Some surfactants can lead to foaming problems resulting in poor handling problems. On the other hand, defoamer surfactants may be necessary to reduce the resin form foaming. Any dispersant, emulsifier, or surfactant used in the emulsion, must not affect the final resin/wax emulsion adhesive qualities. For example, lignosulfonate-based dispersants provide suitable wax-in-water emulsions.

Typically, a sufficient amount of the wax emulsion is blended with the resin to impart the desired level of water-resistant properties to the final composite. Generally, the amount will not exceed 50 wt % of the total adhesive used although amounts greater than 50 wt % are not excluded. The preferred amount will depend on the composites intended use and target properties. In most cases, the wax emulsion will be used in an amount between about 4 wt % and 33 wt % based on solids of the resin/wax emulsion adhesive.

Since the wax emulsion does not need to be modified and no special handling of the wax emulsion is required, the wax emulsion can be easily blended with the phenolic resin at the users end, such as at a mill. The modified phenolic resin also allows for easy blending of the wax emulsion at different wax emulsion levels. The mixture of phenolic resin/wax emulsion remains homogeneous during the manufacturing of wood composites.

If desired, the wax may be adjusted as described in copending application Ser. No. 08/793,731 filed Mar. 3, 1997, which is hereby incorporated by reference in its entirety. The prepared phenolic resin modified with the alkali salt of sulfite or bisulfite is combined with a wax emulsion by:

(a) heating the resin to an initial temperature of above 40° C., wherein the resin has a pH of about 9 to 12;

(b) adjusting the pH of a wax emulsion to within about 1 pH unit of the pH of the resin; and (c) combining the wax emulsion with the resin and mixing while maintaining the temperature of the resin above 40° C.

Preferably, the initial temperature is between about 60° C. and 85° C., more preferably between about 60° C. and 75° C. In addition, the temperature is maintained within 5° C. of the initial temperature. The pH of the wax emulsion is adjusted with an effective amount of a base such as sodium hydroxide.

The resin and wax emulsion combination of the present invention can be used to improve the water absorption properties of any composite product that is prepared using a furnish, a sizing agent and a thermosetting resin. The furnish may be wood, textile, or wood/textile combinations. Wood furnish include fibers, particles, scrim, flakes, veneer, and the like, and combinations thereof. Textile furnish includes fibers of polyester, nylon, and the like. Examples of composites include, but are not limited to OSB, wafer board, particle board, hardboard, medium density fiberboard (MDF), SCRIMBER®, LVL, plywood, oriented strand lumber, parallel strand lumber, and textile fiber mats (e.g., for ceiling tiles and sound insulation.)

The resin and wax combination may be applied to the furnish in any suitable manner, for example, as atomized drops using a sprayer or spinning disk or by a roll coater or by a curain coater. The resinated furnish may then be formed into a mat and placed into a hot press at 350 to 450° F. for consolidation into a unitary composite. Those skilled in the art appreciate that other types of pressing equipment or heating equipment such as radio-frequency devices, microwave and steam injection presses can be used. Appropriate pressure is applied to the mat to compress to the desired final thickness for a time sufficient to allow the resin to cure and bond the furnish or consolidate the composite.

EXAMPLES

The invention will be further described by reference to the following examples. These examples should not be construed in any way as limiting the invention to anything less than that which is disclosed or which could have been obvious to anyone skilled in the art.

Example 1
Preparation of the Resin.

A resin is prepared using the following:

| | |
|---|---|
| Phenol | 29.5 wt % |
| Formaldehyde (50% solution) | 35.8 wt % |
| Water | 20.0 wt % |
| Sodium sulfite | 8.0 wt % |
| Caustic (50% solution) | 6.7 wt % |

In a reactor, 29.5 wt % phenol is combined with 15.1 wt % formaldehyde (50% solution). Then, 20.0 wt % water is added to the mixture. A 8.0 wt % sodium sulfite change is added and the batch is allowed to exotherm toward 58–60° C. Over 10 to 15 minutes, 1.0 wt % of caustic (50% solution) is added and the batch is then allowed to exotherm towards 79–82° C. Over a 35 to 45 minute period while maintaining a temperature of 79–82° C., 20.7 wt % formaldehyde (50% solution) is added. Then, the batch is allowed to exotherm to 95–97° C. over a 10 to 20 minute period. When 95–97° C. is reached, the batch is held for 15 minutes. The batch is then cooled to 80–82° C. over a 10 minute period and then held at 79–82° C. until the viscosity is within the Gardner-Holdt "N" viscosity range. 5.7 wt % caustic (50% solution) is added while cooling the mixture to 74–76° C. The batch is allowed to react until a Gardner-Holdt "R" viscosity range is reached, then cooled to storage temperature.

The resin can then be blended with the wax or wax emulsion at cold or warm temperatures, preferably room temperature, and at any desirable proportions.

Example 2

A 1.8 wt % sulfite-modified resin based on resin solids was prepared and blended at elevated temperatures with 8 wt % wax emulsion having a pH adjusted to 11–12. The ingredients were combined to form a usable thermosetting resin having the sulfite substituent that was compatible with wax emulsions. The sulfite-modified resin had better wax compatibility than a similar resin without the sulfite modification.

An 18 wt % sulfite-modified resin based on resin solids was prepared and blended with several amounts of wax emulsion (4–30 wt % on a liquid/liquid basis) having the as delivered pH, typically between 5–8, and blended with the resin at ambient temperatures, 20–25° C. There was no noticeable separation of the suspended wax in any of the samples even after stressing the adhesive.

Compatibility of these mixtures was evaluated by stressing the mixture in a mixer. A sample of the resin/wax adhesive was stressed in a mixer fitted with a wire whisk set at high speed for seven minutes. After this time, the stressed mixture was poured into a beaker and allowed to stand for 2 to 12 hours. No wax solids appeared on top of the mix. An unstable resin/wax mixture will typically form a cake of wax solids on top of this stressed mixture.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A phenolic resin/wax emulsion adhesive comprising a phenolic resin combined with a wax emulsion wherein the phenolic resin is compatible with the wax emulsion and is prepared by reacting phenol and formaldehyde in the presence of an alkali salt of sulfite or bisulfite.

2. The adhesive of claim 1 wherein the alkali salt of sulfite is sodium sulfite or potassium sulfite.

3. The adhesive of claim 1 wherein the resin is prepared with 0.1 to 35 wt % of the alkali salt of sulfite or bisulfite based on total resin solids.

4. The adhesive of claim 3 wherein the resin is prepared with 2 to 28 wt % of the alkali salt of sulfite or bisulfite based on total resin solids.

5. The adhesive of claim 4 wherein the resin is prepared with 14 to 24 wt % of the alkali salt of sulfite or bisulfite based on total resin solids.

6. The adhesive of claim 1 wherein the formaldehyde to phenol ratio is between about 1:1 to 3:1.

7. The adhesive of claim 6 wherein the formaldehyde to phenol ratio is between about 1.9:1 to 2.5:1.

8. The adhesive of claim 1 wherein the phenolic resin is combined with the wax emulsion at room temperature.

9. A composite prepared by bonding furnish with the adhesive composition of claim 1.

10. The composite of claim 9 wherein the furnish is wood furnish.

11. The composite of claim 10 wherein the wood furnish is selected from the group consisting of wood fiber, particles, scrim, flakes, veneer, or combinations thereof.

12. A process of making a composite comprising applying the adhesive of claim 1 to a furnish and then pressing and heating.

13. The process of claim 12 wherein a hot press is used for the pressing and heating.

14. The process of claim 12 wherein the furnish is wood furnish.

15. The process of claim 14 wherein the wood furnish is selected from the group consisting of wood fiber, particles, scrim, flakes, veneer, or combinations thereof.

16. The adhesive of claim 1 wherein the phenolic resin is combined with a wax emulsion by:

(a) heating the resin to an initial temperature of above 40° C., wherein the resin has a pH of about 9 to 12;

(b) adjusting the pH of a wax emulsion to within about 1 pH unit of the pH of the resin; and (c) combining the wax emulsion with the resin and mixing while maintaining the temperature of the resin above 40° C.

17. The adhesive of claim 16 wherein the initial temperature is between about 60° C. and 85° C.

18. The adhesive of claim 17 wherein the initial temperature is between about 60° C. and 75° C.

19. The adhesive of claim 17 wherein the temperature is maintained within 5° C. of the initial temperature.

20. The adhesive of claim 16 wherein the pH of the wax emulsion is adjusted with an effective amount of a base.

21. The adhesive of claim 20 wherein the base is sodium hydroxide.

\* \* \* \* \*